UNITED STATES PATENT OFFICE.

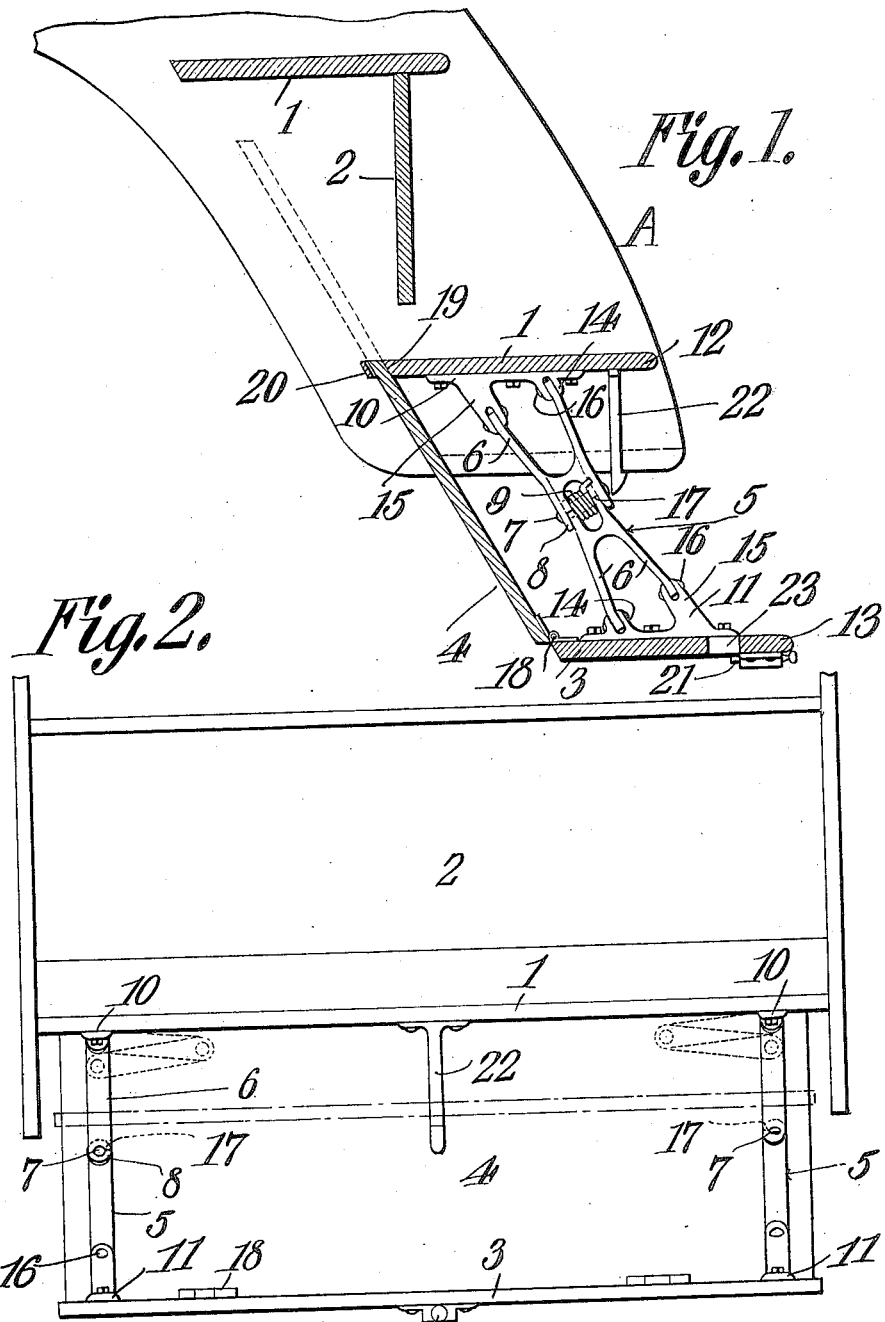

SARAH LEVY MARCUS, OF TALLAHASSEE, FLORIDA.

FOLDING CAR-STEP.

No. 902,670.    Specification of Letters Patent.    Patented Nov. 3, 1908.

Application filed March 4, 1908. Serial No. 419,161.

*To all whom it may concern:*

Be it known that I, SARAH LEVY MARCUS, a citizen of the United States, residing at Tallahassee, in the county of Leon and State of Florida, have invented a new and useful Folding Car-Step, of which the following is a specification.

This invention relates to a folding extension step designed more particularly for use in connection with railroad coaches to do away with the necessity of the usual stool employed by the porters and brakemen for assisting passengers to and from the car.

The invention has for one of its objects to provide an extension step of this character which can be readily applied to ordinary car steps with no, or substantially little, alteration being required, and which is thoroughly reliable and effective in operation.

A further object is the provision, in connection with a folding step, of means for so mounting the same on the lower tread of the car step as to permit of the extension step being folded to a position under the latter and locked in such position so as to be out of the way when not in use.

Another object of the invention is to improve and simplify the construction and operation of folding car steps so that they will be inexpensive to manufacture and easy to operate.

With these objects in view, and others, as will appear as the nature of the invention is better understood, the invention comprises the various novel features of construction and arrangement of parts, which will be more fully described hereinafter and set forth with particularity in the claims appended hereto.

In the accompanying drawing, which illustrates one of the embodiments of the invention, Figure 1 is a vertical transverse section of the extension step applied to an ordinary car step of a passenger coach. Fig. 2 is a front elevation thereof.

Corresponding parts in the several figures are indicated throughout by similar characters of reference.

Referring to the drawing, A designates a portion of one of the stairs forming a part, or used in connection with, a platform of a passenger coach, of which 1 are the treads and 2 the risers. The steps may be of any approved construction and the folding step embodying the principles of the present invention is adapted to be applied thereto as an attachment.

The extension step comprises a tread 3, a back or riser 4 hinged thereto, and brackets 5 for foldably supporting the tread 3. The brackets 5 each comprises cast iron, or other metal, elements or arms 6 hinged together by a pintle 7 passing through registering and apertured lugs 8. These lugs are in the form of bifurcations suitably spaced apart, and between the bifurcations of each set of arms is a helical torsion spring 9 so arranged as to normally hold the arms or elements of the bracket in an extended position. The top and bottom arms of the elements of each bracket are hinged on plates 10 and 11, the plate 10 of the upper arm being bolted, or otherwise suitably secured, to the under surface of the lowermost tread 1 of the steps A, and the plate 11 being suitably secured to the top surface of the tread 3 of the extension step.

In order that the nose 12, Fig. 1, of the lowermost tread 1 may lie in a plane suitably in the rear of the plane of the nose 13 of the tread 3, or, to express it in a different manner, in order to advance the tread 3 of the extension step a suitable distance forward of the main step 1 so that the ascending and descending of the steps will be natural and convenient, the arms 6 of the brackets are hinged to their respective plates 10 and 11 on axes more or less inclined to the horizontal, so that when the brackets are folded inwardly toward each other, the tread 3 will simultaneously move upwardly and inwardly under the lowermost tread 1. For so hinging the arm 6 of the brackets, the plates 10 and 11 are each provided with a long and a short inclined and apertured lug 14 and 15, respectively. These lugs are bifurcated, and between the bifurcations thereof the extremities of the arms 6 are hinged by the pintle 16. As shown in Fig. 1, the corresponding lugs are arranged diagonally opposite each other.

As shown in Fig. 2, supporting brackets of the extension strip are arranged adjacent the ends thereof, so as to afford ample room on the tread 3 between the brackets. The springs 9 of the central hinges of the brackets operate to hold the latter in their extended position, as shown in Fig. 2 by full lines. The overlapping lugs 8 of the central hinges are shouldered, as indicated at 17, so as to prevent the arms of either bracket from bending outwardly when the brackets are extended. This adds stability to the extension step and prevents the same from moving laterally under pressure subjected to it by a person ascending or descending.

The back board or riser 4 of the extension step inclines rearwardly from the tread 3 and is hinged at its bottom edge to the rear edge of the tread 3 by the hinges 18. The upper, or free, end of the riser 4 is supported in a slot formed by the rear edge 19 of the lowermost tread 1 and the strip or bar 20 suitably secured at its ends to the main steps A. This slot serves to guide the movement of the riser 4 as the extension step is folded or unfolded. The hinges 18 afford a sufficient amount of flexibility to enable the riser 4 to move without binding.

In order to fold the extension step from its full line to its dotted line position, the brackets 5 are collapsed inwardly toward each other by suitably applying pressure thereto and to the tread 3, which may be done by a lever, (not shown), mounted on the platform of the car and arranged to unfold or lower the extension step. By reason of the tension of the springs 9, the brackets tend to open after being collapsed, so that a positive locking device must be employed for holding the extension step in its folded position under the lowermost tread 1. Any suitable locking device may be employed for this purpose, as, for instance, a spring actuated bolt 21 mounted on the lower side of the tread 3 which is adapted to automatically lock with a shouldered finger 22 depending from the under side of the lowermost tread 1. As the folding step is collapsed, or folded, the lower end of the finger 22 passes through an opening 23 at the rear of the bolt 21 and automatically interlocks with the bolt. When it is desired to open the step, all that is necessary is to withdraw the bolt 21 and the springs of the bracket will cause the step to be extended.

From the foregoing description, taken in connection with the accompanying drawing, the construction and method of operation, and the advantages thereof, it is believed, will be readily understood, so that further description is deemed unnecessary.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

1. The combination of a step having treads and risers, hinged members secured to the bottom surface of the lowermost tread, a step supported by the said members, and a hinged riser on the last mentioned step.

2. The combination of a tread of a main step, a tread of an extension step, and brackets connecting the treads, said brackets comprising hinged elements that fold inwardly between the treads.

3. The combination of spaced treads, and brackets adjacent the ends of the treads, said brackets comprising hinged elements, and springs operating on the elements to maintain the brackets normally extended.

4. The combination of spaced treads, brackets which fold inwardly between the treads, and a device between the treads for holding the latter folded together.

5. The combination of a fixed step, a foldable step, spring actuated and collapsible brackets supporting the foldable on the fixed step, and an automatic locking device for holding the second step in a folded position against the tension of the springs of the brackets.

6. The combination of a fixed step, a folding step comprising a tread and a riser hinged together, and means engaging the free end of the riser for guiding its movement during the folding of the second step.

In testimony that I claim the foregoing as my own, I have hereto affixed my signature in the presence of two witnesses.

SARAH LEVY MARCUS.

Witnesses:
  MARIE R. MARCUS,
  N. E. BASSETT.